United States Patent
Stanev

(10) Patent No.: US 7,613,445 B1
(45) Date of Patent: Nov. 3, 2009

(54) COST CONTROL SYSTEM FOR ACCESS TO MOBILE SERVICES

(75) Inventor: Radoslav Stanev, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 435 days.

(21) Appl. No.: 11/318,241

(22) Filed: Dec. 22, 2005

(51) Int. Cl.
*H04M 11/00* (2006.01)

(52) U.S. Cl. .................. 455/407; 455/405; 455/406; 455/408; 455/445; 455/552.1; 455/456.1; 379/114.06; 705/14

(58) Field of Classification Search .................. 455/407, 455/432.1, 552.1, 435.2–435.3, 558, 406; 379/114.06

See application file for complete search history.

(56) References Cited

U.S. PATENT DOCUMENTS

| | | | | |
|---|---|---|---|---|
| 5,303,297 | A * | 4/1994 | Hillis .......................... | 455/406 |
| 5,577,100 | A * | 11/1996 | McGregor et al. ........... | 455/406 |
| 5,828,737 | A * | 10/1998 | Sawyer .................. | 379/114.07 |
| 5,903,832 | A * | 5/1999 | Seppanen et al. ......... | 455/435.3 |
| 5,915,214 | A * | 6/1999 | Reece et al. ................. | 455/406 |
| 6,101,379 | A * | 8/2000 | Rahman et al. ............. | 455/406 |
| 6,192,350 | B1 * | 2/2001 | Kies et al. .................... | 705/400 |
| 6,434,380 | B1 * | 8/2002 | Andersson et al. .......... | 455/406 |
| 6,556,817 | B1 * | 4/2003 | Souissi et al. ............... | 455/406 |
| 6,690,929 | B1 * | 2/2004 | Yeh .............................. | 455/406 |
| 6,859,653 | B1 * | 2/2005 | Ayoub et al. ............. | 455/435.2 |
| 6,934,530 | B2 * | 8/2005 | Engelhart ................... | 455/406 |
| 6,959,183 | B2 * | 10/2005 | Hutcheson et al. .......... | 455/406 |
| 7,058,387 | B2 * | 6/2006 | Kumar et al. ................ | 455/406 |
| 7,184,749 | B2 * | 2/2007 | Marsh et al. ................. | 455/408 |
| 2002/0077107 | A1 * | 6/2002 | Eng et al. .................... | 455/445 |

OTHER PUBLICATIONS

Ericsson: Mobile Positioning System, Jan. 28, 2003, [online] [Retrieved on Sep. 7, 2005] Retrieved from the Internet<URL:http:www.ericsson.com/mobilityworld/sub/open/technologies/mobi...>.
Nokia: Location Aware Applications Take Off, 2004, [online] [Retrieved on Sep. 7, 2005] Retrieved from the Internet<URL:http:www.nokia.com>.
Nokia: Location Technologies and Mobile Location Services, 2005, [online] [Retrieved on Sep. 7, 2005] Retrieved from the Internet<URL:http:www.nokia.com/nokia/0,8764,56867,00.html>.
Psiloc Mobile Solutions: Mini EPS, [online] [Retrieved on Sep. 7, 2005] Retrieved from the Internet<URL:http:www.psiloc.com/index.html?action=ShowArticleItem$ida=154>.

* cited by examiner

*Primary Examiner*—Sharad Rampuria
(74) *Attorney, Agent, or Firm*—Fenwick & West LLP

(57) ABSTRACT

The cost control module 120 controls costs associated with automated access to mobile services for processes running on mobile devices 110. The module 120 performs cost control in a user-friendly manner so the user is affected by the processes as minimally as possible, but the user is also not forced to pay large fees when the processes access certain mobile services. If a program needs to access a mobile data service to complete a function, the module 120 determines what various mobile services are available, and the cost of accessing each service. The module 120 prioritizes the services according to cost. The value of granting the program access to the service is weighed against the cost of access and a determination is made regarding whether access should be allowed.

15 Claims, 7 Drawing Sheets

```
601   MSTMS A, cost: Medium
      {
              IMSI = 1234567890;
              NetworkProviderID = Cingular;
              NetworkCellID = 5555500000 through 5555599999;
              Time = Mon through Fri, 12:00am through 11:59pm;
              Service = GPRS;
      }

602   MSTMS B, cost: Low
      {
              IMSI = 1234567890;
              NetworkProviderID = Cingular;
              NetworkCellID = 5555500000 through 5555599999;
              Time = Sat, Sun, 12:00am through 11:59pm;
              Service = GPRS;
      }

603   MSTMS C, cost: Medium
      {
              IMSI = 1234567890;
              NetworkProviderID = T-Mobile;
              NetworkCellID = 4444400000 through 4444411111;
              Time = Mon through Fri, 12:00am through 11:59pm;
              Service = GPRS;
      }

604   MSTMS D, cost: Low
      {
              IMSI = 1234567890;
              NetworkProviderID = T-Mobile;
              NetworkCellID = 4444400000 through 4444411111;
              Time = Sat, Sun, 12:00am through 11:59pm;
              Service = GPRS;
      }

605   MSTMS E, cost: High
      {
              IMSI = 1234567890;
              NetworkProviderID = Cingular;
              NetworkCellID = 6666600000 through 7777788888;
              Time = Any day, any time;
              Service = GPRS;
      }
```

FIG. 6

COST CONTROL SYSTEM FOR ACCESS TO MOBILE SERVICES

BACKGROUND OF THE INVENTION

1. Field of the Invention

This invention pertains in general to mobile services, and more specifically to a cost control system for automated access to mobile services for processes running on mobile devices.

2. Description of the Related Art

Historically, mobile devices (e.g., cell phones, personal digital assistants or PDAs, pagers, and the like) have generally followed the principles of "service-on-demand" usage. For example, the user can knowingly choose to use a voice service when dialing or accepting an incoming call on a cell phone or the user can knowingly choose to use a data service when starting an Internet browser. Part of the user's determination resulting in a given choice is the cost of using the particular service. This cost is usually variable. The cost can depend, for example, on factors set forth by the mobile service provider (e.g., commonly an operator like CINGULAR® Wireless, T-MOBILE®, VERIZON® Wireless, etc.) that were chosen by the user when the user signed up for a mobile service in the form of a service plan. This service plan and the various costs of the services that are included in the plan can be consciously or subconsciously factored into the user's decision-making each time a service needs to be accessed. In short, the user typically has direct manual control over when, how, and what mobile services are accessed by the mobile device.

With the advent of more advanced mobile technologies and services (e.g., smartphones, $3^{rd}$ Generation or 3G devices, and the like), the need for automated use of services (e.g., through programs provided by Symantec, such as LiveUpdate, Event Reporting, License Management, etc.) by devices becomes increasingly important. For example, users may wish to include antivirus technologies and services on mobile devices, and it may be useful to have these technologies perform some automated functions that rely on mobile services (e.g., automatic download of virus definitions, automatic transmittal of event reports containing information about virus scans, etc.). As another example, users may wish to include applications and services for automatic download of software updates when such updates become available. These types of technologies are often processes running in the background of devices, and the technologies may need to periodically access mobile data services to perform their work.

Usability for those programs on mobile devices can become an issue due to the "service-on-demand" concepts around which mobile devices are commonly built. It may not be desirable for these programs to be able to regularly access any type of mobile data service whenever the service is needed since fees accompany many of these services. Thus, it may be preferable to specify when the programs should be allowed to access certain services. On one hand, prompting the user to determine whether it is okay to access a data service to perform work at a scheduled time or upon a certain event negates any automation behind those programs' designs and also causes extra hassle for the user. On the other hand, fully automating the programs to access data services at any time could incur costs that the user may not always find justified. For example, it may be acceptable for the user to pay extra fees in roaming charges to get the latest virus definitions, but it may not be acceptable to pay extra fees to send an event report containing the last time a full virus scan was performed. Thus, there is a dilemma regarding whether (and when) to bother the user in these situations. This dilemma will become more and more prevalent as the worlds of mobile-technology and mobile services evolve.

Therefore, there is a need in the art for a user-friendly cost control system for automated access to mobile services for background processes running on mobile devices, where the system minimizes the interruption caused to the user while still allowing the background processes to perform work in a more cost-effective manner.

DISCLOSURE OF INVENTION

The above need is met by a cost control module that controls costs associated with access to a mobile data service through a mobile device. An information acquisition module acquires information regarding mobile data services available for a program on the mobile device to access to perform a function. A cost assessment module assesses cost for accessing available mobile data services and a prioritization module prioritizes the available mobile data services based on the cost to select a preferred mobile data service for access by the program. In some embodiments, a value determination module determines the value provided if the program is granted access to the preferred mobile data service. A comparison module compares value provided if the program is granted access to the preferred mobile data service to the cost for accessing the preferred mobile data service. A decision module determines whether to allow the program to access the preferred mobile data service based on the comparison.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 6 illustrates an example of a sample set of MSTMS records 601, 602, 603, 604, and 605 populated with information describing a particular plan, according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The cost control module controls costs associated with automated access to mobile services for processes running (e.g., running in the background, running in the foreground, etc.) on mobile devices. The module performs cost control in a user-friendly manner so the user is affected by the processes as minimally as possible, but the user is also not forced to pay large fees when the processes access certain mobile services. The mobile services are accessed in a cost effective manner. For example, if a program needs to access the Internet to complete a particular action, the module can determine the various mobile services through which the Internet can be accessed and can also determine the cost of access through each service.

In addition, the value provided to the user when the program completes its action by using the service can also be weighed against the cost of access to determine whether access should be allowed at the current time or should be allowed at all. For example, the program might be allowed to access the Internet to download virus definitions, since this action may be of great value to the program and may be valuable to the user. However, the program may be not be allowed access the Internet to send out an event report regarding the last virus scan until the user is in a local, non-roaming area where fees associated with this action are not as high. Thus, in some embodiments, the module assesses costs for accessing each of the available services through which the program can perform a function and selects the best service by prioritizing based on cost. In addition, the module can weigh the costs of access against the value provided by access and can make a decision regarding whether to or to not allow the access. In some embodiments, the module also includes learning abilities that allow the module to learn from and thus to take advantage of past interactions with the user.

As used herein, the term "mobile service" or "mobile data service" can include any service provided by a mobile service provider (e.g., VERIZON® Wireless, T-MOBILE®, CINGULAR®, AT&T® Wireless, SPRINT PCS®, and the like), including services such as providing access to voice calls, text messaging, Internet access, information download and upload capabilities, etc., or a collection of one or more of these.

Figure 1:
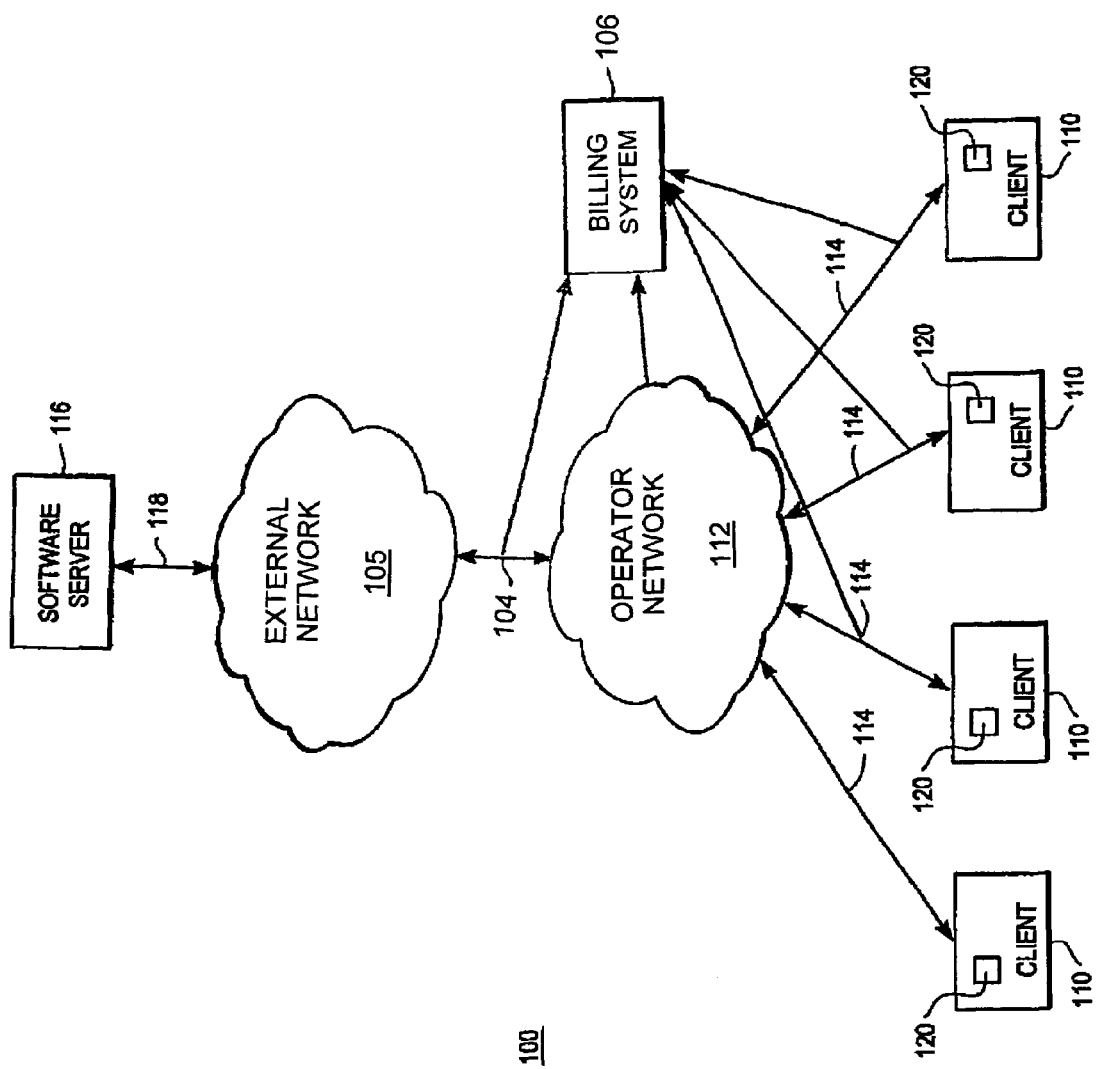
FIG. 1 is a high-level block diagram illustrating an example of a standard mobile computing environment 100, according to one embodiment of the present invention.

FIG. 1 is a high-level block diagram illustrating a mobile computing environment 100, according to an embodiment of the present invention. Multiple mobile devices 110 are in communication with the operator network 112 (e.g., a wireless network, the Internet, an intranet, a local area network, wide area network, etc., or a combination of the above set of networks) via communications links 114. Although only four mobile devices 110 are shown in FIG. 1, there can be thousands or even millions of devices coupled to the operator network 112, according to embodiments of the present invention. In one embodiment, the mobile devices 110 are different electronic devices, such as cellular telephones, personal digital assistants (PDAs), smart phones, 3G devices, etc. An external network 105 (e.g., a wireless network, the Internet, an intranet, a local area network, wide area network, etc., or a combination of the above set of networks) is connected to the operator network 112 via communications link 104. A server 116 can also be connected to the external network 105 via a communications link 118. A billing system 106 is connected to key parts of the mobile computing environment owned or controlled by a mobile service provider (e.g., the operator network 112, the links between network components 114, 104, etc.). The billing system 106 tracks the mobile device's 110 usages of the key parts of the environment and applies or assists in applying appropriate usage charges.

As is known in the art, the mobile devices 110 preferably execute an operating system and one or more application programs. In some embodiments, the mobile device 110 includes an operating system that controls the operation of the system, and some examples of such an operating system include SYMBIAN OS™, one of the versions of MICROSOFT WINDOWS®, LINUX®, PALM OS®, and the like including versions of such operating systems adapted to run on mobile devices 110.

In FIG. 1, each mobile device 110 is connected to the operator network 112 via a communications link 114. Preferably, the communications link 114 utilizes conventional networking technology. For example, in one embodiment, the communications link 114 connects the mobile device 110 via a wireless 802.11, Bluetooth, or mobile phone (e.g., CDMA, GSM, TDMA, AMPS, SS7, etc.) network, satellite downlink, uplink, or bi-directional link, etc. In other embodiments, the mobile device 110 uses a modem to connect over standard telephone lines with an Internet Service Provider (ISP)'s network 112 having a high-speed connection to the external network 105. In another embodiment, a mobile device 110 uses a digital subscriber line (DSL) or cable modem to access ISP's network 112 via a telephone line or cable television line, respectively. In yet another embodiment, the mobile device 110 uses a network card and Ethernet connection to directly connect to the network 112 and through it to the external network 105. Thus, many different types of technology can be used to provide the functionality of the communications link 114.

Individual mobile devices and computers can utilize communications protocols such as the transmission control protocol/Internet protocol (TCP/IP) to send messages to other devices or computers on the networks 112 and 105. These messages can use protocols such as the hypertext transport protocol (HTTP), file transfer protocol (FTP), simple mail transport protocol (SMTP), post office protocol 3 (POP3), and Internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the server 116 to the external network 105, though this server 116 may not be present in all embodiments. The server 116 can send information, such as virus definition updates, software patches, etc., across the networks 105 and 112 and to the mobile devices 110. Additionally, the mobile devices 110 can send out information or make requests (e.g., send out event reports regarding the last virus scan conducted, send requests for software updates, etc.) across the networks 112 and 105 to the server 116 or to other devices 110 or computers. The communications links 118 and 104 are generally the same as the communications links 114 connecting the mobile devices 110 to the operator network 112. Although only one server 116, communications link 118, external network 105, and communications link 104 are shown in FIG. 1, embodiments of the present invention may have multiple servers, networks, and/or links. The server 116 may be a conventional computer system or a network of systems. Embodiments of the present invention may also have the server or servers 116 connected to or even are an integral part of the operator network 112, and may be connected to the billing system 106 as such.

In the embodiment illustrated in FIG. 1, each mobile device 110 executes a cost control module 120 for controlling costs associated with automated access to mobile services for processes running on mobile devices 110. The cost control module 120 can be a discrete application program, or the module 120 can be integrated into another application program or an operating system for the mobile device 110. In some embodiments, a portion of the cost control module 120 is implemented within the billing system 106. In some embodiments, a portion of the cost control module 120 is executed on the server 116. Though the clients 110 are shown as being connected to the operator network 112, in some embodiments the clients 110 are only connected to the operator network 112 for a certain period of time or not at all. Other modifications can be made to accommodate any of the other numerous embodiments of the cost control module 120. Those of skill in the art will recognize that other embodiments can have different and/or additional components than those shown in FIG. 1, and any one or more of the components of FIG. 1 can be missing. Likewise, the functionalities can be distributed among the components in a manner different than described herein.

Figure 2:
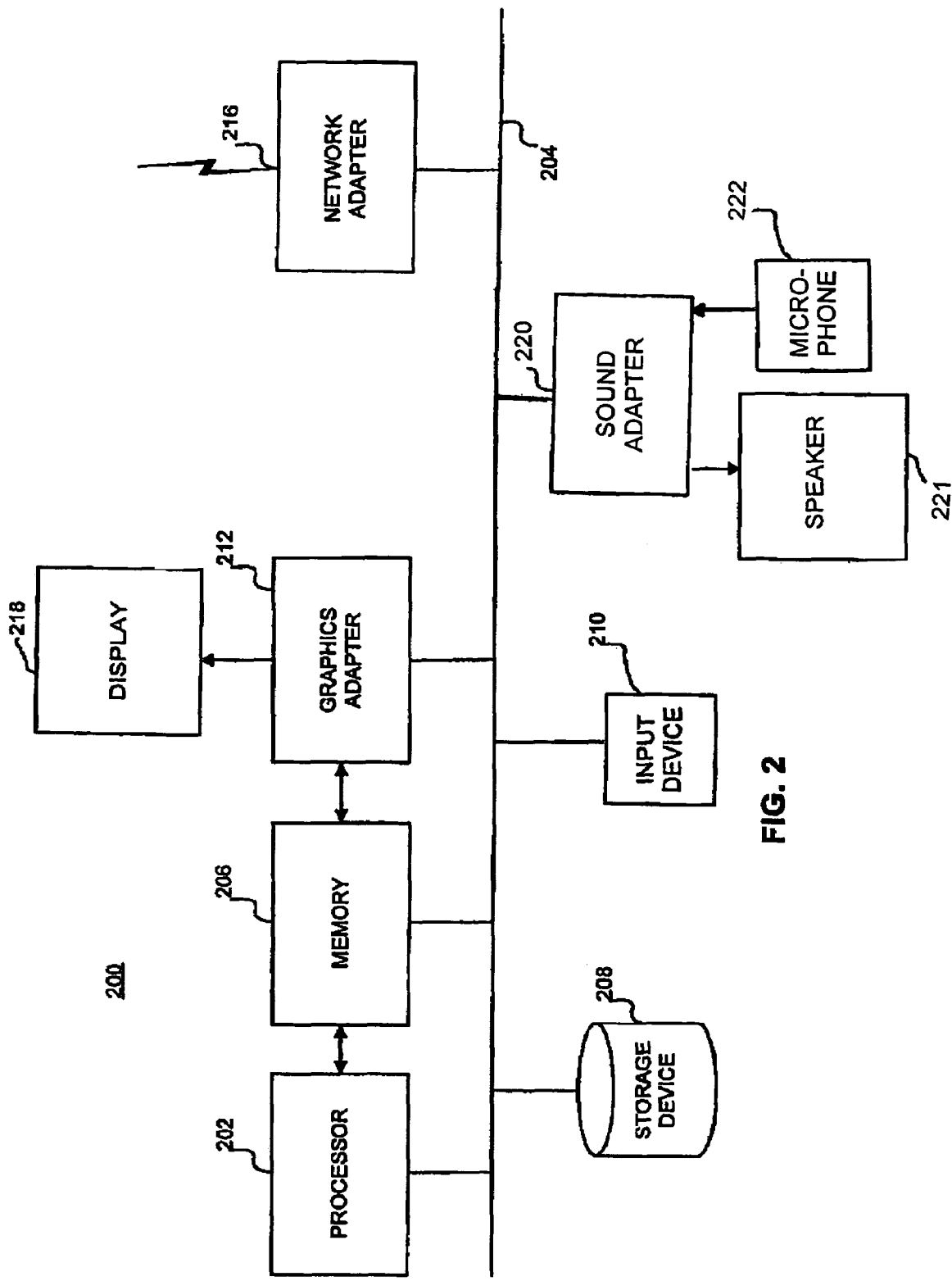
FIG. 2 is a high-level block diagram illustrating a standard mobile device 110 for use with the present invention.

FIG. 2 is a high-level block diagram illustrating a functional view of a typical mobile device 110 (such as the mobile device shown in FIG. 1) for storing and executing the cost control module 120, according to one embodiment of the present invention. However, one or more of the components of the mobile device 110 may be missing or modified. Illustrated is a processor 202 coupled to a bus 204. Also coupled to the bus 204 are a memory 206, a storage device 208, an input device 210 (e.g., a keypad, a pen, a mouse, etc.), a graphics adapter 212, a sound adapter 220, and a network adapter 216. A display 218 (e.g., a screen for displaying information) is coupled to the graphics adapter 212. A speaker 221 and a microphone 222 are coupled to the sound adapter 220.

The processor 202 may be any mobile device-specific processor or custom ASIC, such as an ARM microprocessor, QUALCOMM CDMA2000®, Motorola Dragonball™ microprocessor, etc. The memory 206 may be, for example, firmware, read-only memory (ROM), non-volatile random access memory (NVRAM), and/or RAM, Flash memory, and holds instructions and data used by the processor 202. The storage device 208 can be any device capable of storing data, such as a writeable compact disk (CD) or DVD, and/or a solid-state memory device, a hard drive, SD cards, CF, cards, etc. The input device 210 may be a mouse, track ball, a scrolling device or wheel, up/down/left/right buttons for moving around on a screen and selecting items, or other type of pointing device, and may be used in combination with a keypad to input data into the mobile device 110. The graphics adapter 212 displays images and other information on the display 218. The sound adapter 220 can produce sound data through the speaker 221 and receives sound data through the microphone 222. The sound adapter 220 can be attached to the input device 210 and can use voice recognition as means for user interaction with the mobile device 110. The network adapter 216 couples the mobile device 110 with the operator network 112 through the communication links 114.

As is known in the art, the mobile device 110 is adapted to execute computer program modules for providing functionality described herein. In this description, the term "module" refers to computer program logic for providing the specified functionality. A module can be implemented in hardware, firmware, and/or software. Where any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules form a computer program product and are stored on a computer-readable storage medium such as the storage device 208, loaded into the memory 206, and executed by the processor 202. Alternatively, hardware or software modules may be stored elsewhere within the mobile device 110, or even within components of the mobile computing environment 100.

Figure 3:
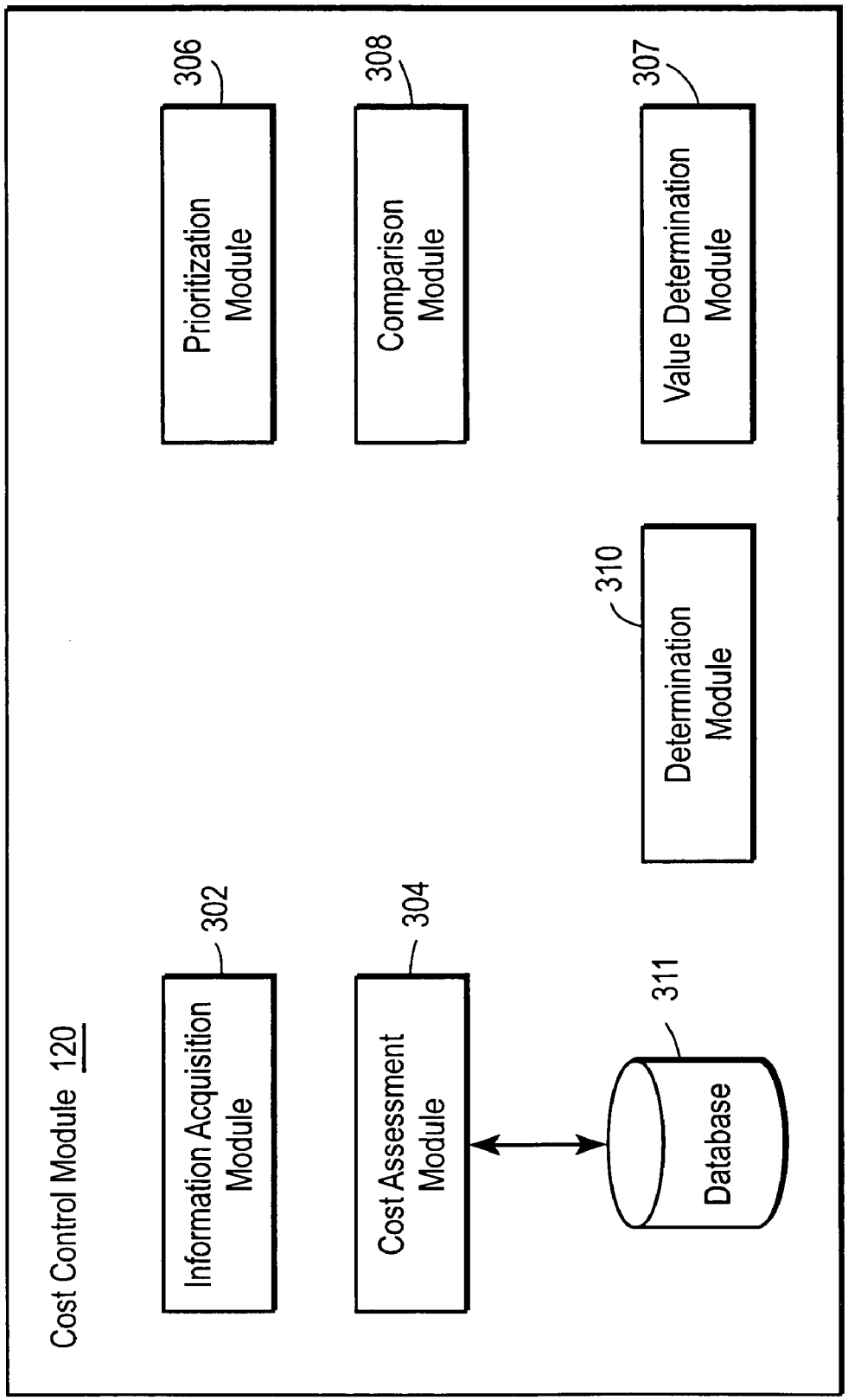
FIG. 3 is a high-level block diagram illustrating the functional modules within the cost control module 120, according to one embodiment of the present invention.

FIG. 3 is a high-level block diagram illustrating the functional modules within the cost control module 120, according to one embodiment of the present invention. The cost control module 120, in the embodiment illustrated in FIG. 3, includes an information acquisition module 302, a cost assessment module 304 associated with a database 311, a prioritization module 306, a value determination module 307, a comparison module 308, and a decision module 310. Those of skill in the art will recognize that other embodiments can have different and/or additional modules than those shown in FIG. 3 and the other figures. Likewise, the functionalities can be distributed among the modules in a manner different than described herein.

The information acquisition module 302 acquires information regarding mobile data services available for a program running on the mobile device 110 to access to perform a function. In some embodiments, the module 302 collects information about the mobile data services available to a mobile device 110 at various positions of the mobile device 110. For example, if the mobile device 110 is a cell phone, different locations may affect the availability or the cost of using certain operator-provided mobile services (e.g., connecting to the Internet, downloading or uploading data, etc.), which are generally included in user's voice or data service plan. A user may be carrying the phone in a local area in which certain services are covered under the cell plan. Alternatively the user may be carrying the phone in an area in which the phone is roaming. Thus, certain features may not be available in that location or may be limited or expensive. In addition, the time of day can affect which services are available. The services that are available during weekday daytime hours may differ from the services available during the night and on the weekend. Thus, the module 302 can acquire information about what services are available for usage by the mobile device 110 at the current location and at the current time.

In some embodiments, the information acquisition module 302 creates an abstract collection of data that can at any time uniquely represent the mobile device's position in a multi-dimensional mobile space/time/mobile service continuum. In other words, the module 302 can collect information about the mobile services and/or service providers at the current location (e.g., mobile space) and at the current time. This information about mobile space/time/mobile service can be collected in one or more records, which will be referred to herein as mobile space/time/mobile service records or "MSTMS" records. In some embodiments, the MSTMS record is not persistent, and it exists only temporarily in the memory of the mobile device 110. In other embodiments, the MSTMS record is persistently stored as a file, as a database, as a record inside a file, as records of information stored across several files or databases, as records in a registry, and the like. In other embodiments, the record is stored in some other manner. In some embodiments, the MSTMS record is stored locally on the mobile device 110. In other embodiments, the record is stored externally (e.g., on a server, in memory on a local computer, etc.), but can be accessed by the mobile device 110 (e.g., through a wireless link, through a wired link when the device 110 is docked at a station, etc.) when necessary.

Figure 4:
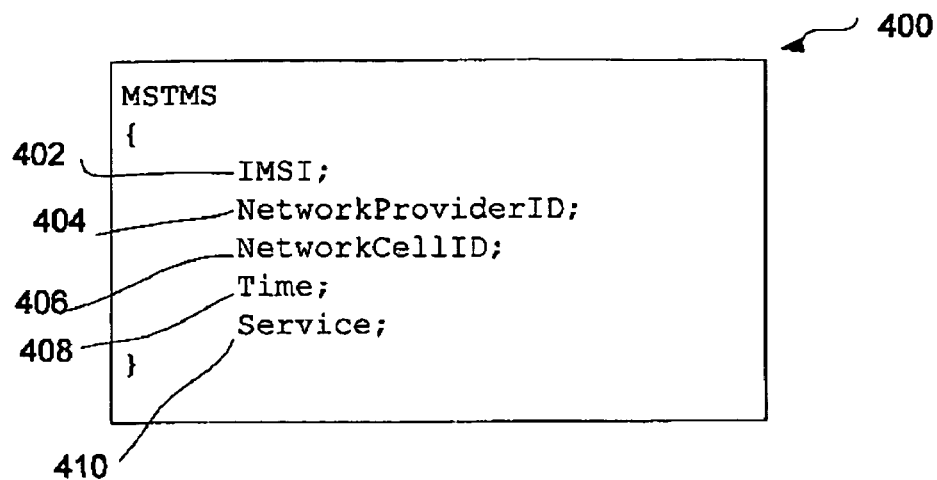
FIG. 4 illustrates an example of an MSTMS record 400 and the type of information that can be stored in such a record, according to one embodiment of the present invention.

FIG. 4 illustrates one example of an MSTMS record 400 and the type of information that can be stored in such a record. The MTSMS record 400 can include one or more fields for storing information. In the FIG. 4 example, the MSTMS record 400 includes five fields into which information acquired by the information acquisition module 302 can be inserted. In FIG. 4, there is shown an International Mobile Subscriber Identifier field or an IMSI field 402 into which the IMSI number for a mobile device 110 working on a Global System for Mobile Communications network or GSM network can be inserted. IMSI is a property of GSM Subscriber Information Module cards or SIM cards for uniquely identifying a user and linking to a home operator/plan in a global GSM network. The FIG. 4 example also shows a Network Provider ID field 404 and a Network Cell ID field 406, into which an identifier for the network provider (e.g., VERIZON® Wireless, CINGULAR® Wireless, etc.) and an identifier for the location or cell being used by the mobile device 110 can be stored, respectively. FIG. 4 also illustrates a Time field 308 and a Service field 310 into which information can be entered about the current date and/or time and the type of mobile service available (e.g., General Packet Radio Service or GPRS, Circuit Switch Data or CSD, Enhanced Data for GSM Evolution or EDGE, etc.)

In some embodiments, depending on the device, mobile technology, and type of mobile data service, it is possible that not all fields enumerated in the FIG. 4 example are applicable and are present in every embodiment. For example, IMSI is a property of GSM SIM cards for uniquely identifying a user and linking to home operator/plan in a global GSM network. Non-GSM systems may use different methods of identification, and so the IMSI field 402 may not be present in MSTMS records 400 created with regard to non-GSM systems. Similarly, fields applicable to non-GSM systems that are not enumerated in the FIG. 4 example can be present in other embodiments. In addition, fields for user-friendly textual representation of MSTMS records 400, memory and storage management, etc. can be included, as well. Thus, the MSTMS records 400 can include additional fields not shown in FIG. 4, can be missing fields, or can include entirely different fields.

As described above, in some embodiments, one or more MSTMS records 400 describing the mobile data services available to a device at any given position in time and space are created. In some embodiments, whenever a program running on a mobile device 110 needs to perform some background work involving access to mobile services, the system generates a set of MSTMS records 400 that represent the current availability of services through which the application can perform its work. The information acquisition module 302 may acquire information about any service available, even those services that are not included in the user's mobile service plan or services that are provided by service providers other than the one with which the user has a subscription for services.

As one example, a particular program or application may need to access the Internet. With GSM technology, this can be done by using more than one data service, including CSD, GPRS, EDGE, etc. Depending on the position of the mobile device 110, quality of service, and other factors, the generated set may contain 0, 1, or more MSTMS records 400. In some embodiments, an MSTMS record is created for each data service available. In other embodiments, the information can be combined into one record 400 or divided in a different manner between one or more records 400. The record(s) 400 created can also include information about Internet access services which are not covered by the user's plan. In other words, the module 302 can acquire information about all services available at the current time in the current location, even the services for which the user has not subscribed or may not be of direct or indirect help to the program.

Figure 5:
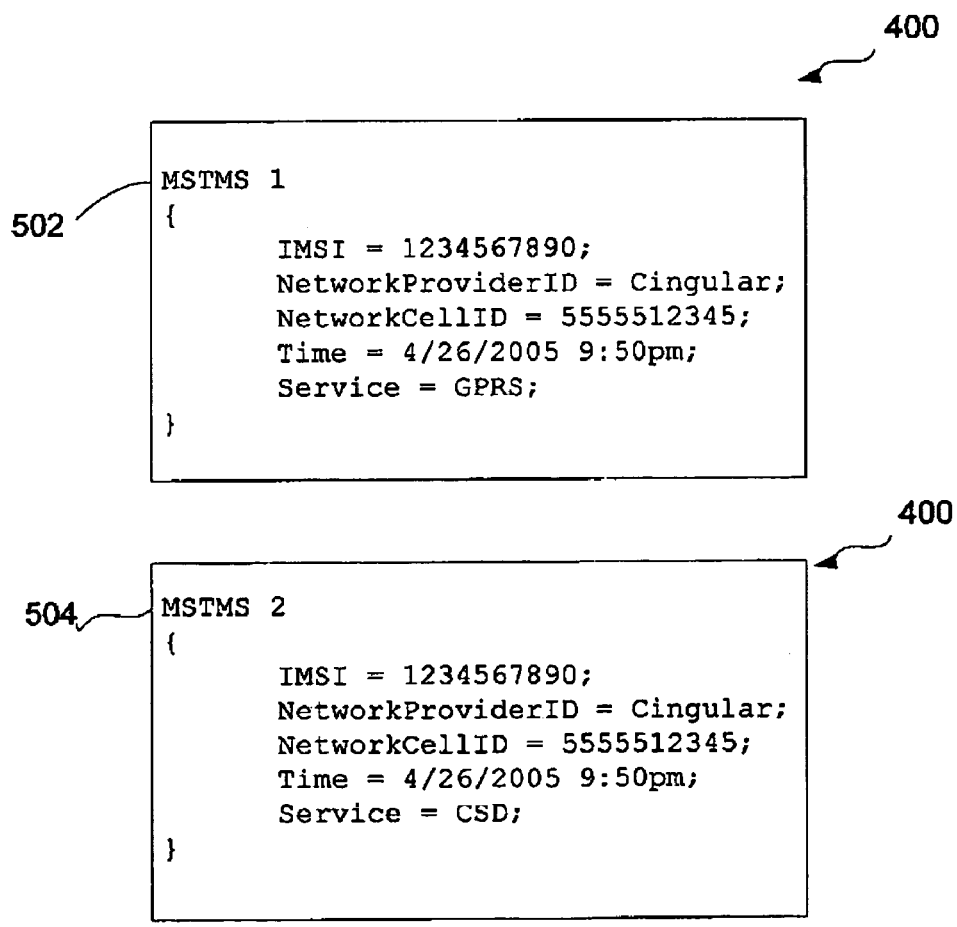
FIG. 5 illustrates an example of a sample set of MSTMS records 400 populated with information on mobile data service availability, according to one embodiment of the present invention.

FIG. 5 illustrates an example of a number of MSTMS records 400 populated with an example of the type of information that can be stored in the fields by the information acquisition module 302. The FIG. 5 example illustrates a user with a mobile device 110 with the global GSM ID of 1234567890. In the example of FIG. 5, there are shown two MSTMS records, MSTMS 1 or record 502 and MSTMS 2 or record 504 for the mobile device 110 with GSM ID 1234567890. For the user with this GSM ID, at the location where there is a single network cell with an ID of 5555512345 and at the current date of Apr. 26, 2005 and time of 9:50 p.m., there is one operator, CINGULAR® Wireless, providing access to mobile data services. Those services are GPRS and CSD. In an urban area with multiple competing operators, the set of MSTMS records 400 can contain a much larger number of entries and there can be more MSTMS records 400.

Referring again to FIG. 3, the cost assessment module 304 assesses the costs for accessing available mobile data services. For a program running on a mobile device 110 to exchange data (e.g., download virus definitions, send out security information, etc.), the program may need to access certain mobile services available through the operator-controlled environment for which the user may be charged. The cost associated with accessing certain services can vary depending upon a number of factors. For example, the cost of accessing mobile services often varies according to rules defined by the home operator in the form of a mobile service plan for which a user subscribes. Costs can also vary according to the physical location of the mobile device 110 in space (e.g., whether the mobile device 110 is located within the user's local service area, in a roaming area, etc.), the time of day (e.g., weekday, weekend, daytime, evening, etc.), and the like. For example, when a user is in an area in which the mobile device 110 is roaming (according to the user's mobile service plan), certain features may be more expensive. In addition, the services that are available during weekday daytime hours may be more costly than the services available during the night and on the weekend (if the user's plan so specifies).

In some embodiments, the cost assessment module 304 creates one or more MSTMS records 400 to describe the plan chosen by the user, including describing the costs for accessing certain mobile data services by a mobile device 110 at any given location and time. MSTMS records 400 created by the cost assessment module 304 can contain explicit values in their fields in some embodiments, or complex (e.g., a range from-to) values in their fields in other embodiments, or a combination of explicit and complex values. These MSTMS records 400 describing costs can be different from the records 400 described above that store information about the mobile data service availability. In some embodiments, the MSTMS records 400 describing the plan to which the user subscribed and the costs associated with the plan's services at various locations and times can be stored in a persistent database 311 (as shown in FIG. 3) either locally or externally and can be retrieved by the cost assessment module 304 from that database 311.

The information regarding the general costs associated with various different mobile services (e.g., various different data exchange services) under the user's mobile service plan is provided by the mobile service provider, in some embodiments. The module 302 can automatically store (e.g., in a database 311, as stated above) the cost information provided by the mobile service provider or a database 311 pre-populated with information about the user's plan can be pushed onto the mobile device 110. The information can be accessed whenever a program running on the mobile device 110 needs to exchange some data or use one of the mobile services. Thus, the program can query the cost control module 120 regarding a particular service or services that the program needs to use, and the cost assessment module 304 can retrieve general information stored regarding the user's plan and costs associated with using the desired service at different locations/times of day. When the program running on the mobile device 110 needs to access a service and the cost information for accessing that service is not in the database 311 or is not otherwise available, the user can be prompted to provide information regarding the cost for using the service (e.g., a dialog box can be presented to the user on the mobile device 110 requesting that the user input subscription information). Thus, the user is generally only bothered when certain information is not available in the database 311 and only missing information must be obtained from the user.

In other embodiments, if the mobile service provider does not provide subscription information or a pre-populated database 311, the user can be prompted any time cost information is needed. In these embodiments, the cost control module 120 can include learning abilities allowing it to learn about user's service plan and user's cost determination patterns each time the user responds to a prompt. For example, it can learn that the user is willing to pay costs up to a certain level for a particular service, and it can implement that knowledge in future decisions without bothering the user again. In some embodiments, the user can pre-enter any subscription information and thus configure the database 311 at one time (e.g., at first usage of the mobile device 100, or when the cost control module 120 is first installed, etc.). Thus, the user would only need to be prompted for information that was not initially pre-entered.

FIG. 6 illustrates an example of a sample set of MSTMS records for a plan provided by CINGULAR® Wireless, which contains five MSTMS records, 601, 602, 603, 604, and 605. These records describe a regional GPRS-only data plan of a subscriber with global GSM ID of 1234567890. In this example, the home area or plan subscription area for using the mobile data services is enclosed within CINGULAR® Wireless cells falling within the network cell ID within the range of 5555500000 through 5555599999. The CINGULAR® plan in this example includes different pricing for work days versus weekends (e.g., medium price vs. low price). This portion of the plan is described by MSTMS records A 601 and B 602. A secondary part of the CINGULAR® network consisting of network cell IDs within a range of 6666600000 through 7777788888 is considered a roaming area and it has high pricing at all times. This part of the plan is described by MSTMS record E 605.

In order to provide logical geographical coverage, mobile data service providers often have private agreements to provide services to each other's subscribers by exchanging or sharing network cells. In the example of FIG. 6, GPRS data services are also provided by the service provider, T-Mobile, when the device is within the range of network cell ID 4444400000 through 4444411111 at the same rates as subscriber's home area or plan subscription area when using CINGULAR®. This part of the plan is described by MSTMS records C 603 and D 604. To fully describe a given plan, the set may contain many more records, including not only home service provider entries, but numerous entries for providers with which the home operator (e.g., CINGULAR®, in this example) has private agreements, both locally and internationally.

The example of FIG. 6 illustrates MSTMS records 400 for one type of service (e.g., GPRS). However, MSTMS records 400 can be created for numerous other types of services (e.g., CSD, EDGE, etc.)—as many as are available under a subscription plan, and these MSTMS records 400 can be stored, as described above. The records 400 for any given service can be accessed when a particular program needs to use that service, and the records 400 can provide cost information for using that service at different times of day and/or at different locations.

As stated above, the costs associated with each of the services (e.g., GPRS service in the FIG. 6 example) can be included in the MSTMS records 400. In the FIG. 6 example, the costs are represented as high, medium, and low. However, other representations can be used (e.g., very costly, not very costly, free, etc.), other levels can be used (e.g., very high, very low, etc.), other styles of representation can be used (e.g., a slider bar with a button that slides along a bar that runs from the highest cost to the lowest cost and the position of the button on the bar represents the cost between the high and low-extremes, etc.), actual costs can be included or cost ranges (e.g., a cost of $1.00 to access a service or a range of $1.00 to $5.00), and the like. The MSTMS records 400 stored in database 311 can be updated over time as cost information changes in the user's plan or as new services are added, old services are deleted, and the like.

Using the information stored in the database 311 (e.g., the MSTMS records 400 defining the user's plan, including costs of accessing services through various providers under the plan at various locations and times of day), the cost assessment module 304 can also determine the cost of accessing a particular service at the current mobile device 110 location and at the current time of day. As shown in the FIG. 6 example, there may be various options for accessing the service through various mobile service providers (e.g., CINGULAR®, T-MOBILE®, etc.) at different costs. Thus, when a program requests access to a particular service, the module 304 in conjunction with the results from module 302 can determine the current location of the phone and the current time of day, and can use the MSTMS records 400 describing the user's plan to determine which providers can be used to access the service currently. Using the FIG. 6 example, if the user is currently in cell ID range 4444400000 through 4444411111, and the current time is Monday at 4 p.m., the provider T-Mobile under record 603 is the only option for providing access to the GPRS services (and the cost is a medium cost).

The prioritization module 306 prioritizes the available mobile data services based on the cost to select a preferred mobile data service for access by the program. In some embodiments, the program requiring access to a particular mobile service or services queries the cost control module 120 regarding recommended or allowed services to use for performing its function. As stated above, the cost assessment module can determine the cost of accessing a particular service at the current mobile device 110 location and at the current time of day, and there may be various options for accessing the service through various mobile service providers (e.g., CINGULAR®, T-MOBILE®, etc.) at different costs. Out of the different providers of that service at the current time and location, the prioritization module 306 can order the available services according to cost. In some embodiments, the module 306 uses a set of predefined rules for prioritizing to give the highest priority to the best mobile data service (e.g., the least expensive service or the service that provides the most functionality for the least expense). For example, the set of rules can include cost comparison and preferential ordering rules.

In some embodiments, the module 306 orders the available mobile data services according to price, with the least expensive service being listed as the first choice service for the program to use (e.g., the service provided by the home service provider) and the most expensive service being listed as the last choice service (e.g., the service provided by another service provider outside of the home area plan that charges the highest price for usage of the service).

In some embodiments, an optional value determination module 307 determines value provided to the program and/or to the user if the program is granted access to the preferred mobile data service. In some embodiments, the module 307 determines the value to the program simply by receiving value information provided to the module 307 by the program. The program can provide information regarding what function it is trying to perform and whether the value to the program is high, medium, low, or some other specified level of importance.

In some embodiments, the module 307 can determine the value provided to the user if the program is granted access to the mobile service. For example, the user may find certain activities conducted by certain programs more valuable than others. In some embodiments, the value determination module 307 determines the value provided to the user by retrieving preset value information that a user initially specified (e.g., upon first using the mobile device 110 or first installing the cost control module 120) or by prompting the user to provide information about user preferences, as described below. For example, the value of various different functions can be defined by the user through a user interface. When prompted, the user can give a yes or no response regarding whether or not to perform the function at the current time, the user can request that the function be performed later (e.g., when the user is in a non-roaming area or in the evening when the cost for accessing the service may be less), the user can provide subscription information and cost basis information, and the like. As stated above, in some embodiments, the cost control module 120 includes learning abilities so the module 120 can learn based on the user's response to each prompt (e.g., the module 120 can learn what program functionality or services are of more or less value to the user, how much the user is willing to pay for giving the program access to each service to perform certain functionality, and the like).

In some embodiments, the user may opt not to define the values of functions performed by various programs, but instead the user may rely on default values preset in the cost control module 120. The user can also rely on each program to define the value to it of being granted access to a service (e.g., the program can provide information stating that being granted access to a service to perform a particular function is of high value to it), and the cost control module 120 can consider the program's own assessment of value when determining whether to grant access.

The comparison module 308 compares the value provided if the program is granted access to the preferred mobile data service to the cost for accessing the preferred mobile data service. The value being compared to cost by module 308 can be any type of value described above that is determined by the value determination module 307. The module 308 thus weighs the value against the cost to provide information regarding whether the program should be granted access to the mobile service. In some embodiments, each MSTMS record 400 stored in database 311, as described above, is associated with a cost basis that is proportional to the value provided if a program is allowed access to the mobile service.

The decision module 310 determines whether or not to allow the program to access the preferred mobile data service based on the comparison. The decision module 310 thus uses the comparison information provided by the comparison module 308 to decide whether to let the program access the mobile service to perform its function. The module 310 may determine that the cost for accessing a particular service is too high in comparison to the value provided or that the function that the program is trying to perform is of very little value. In this case, the module 310 can temporarily prevent the program from accessing the mobile service to perform its function. For example, the program may not be allowed to perform a function during the weekday or during the daytime when costs are higher (or when the mobile device 110 is in a roaming area). Thus, the program can be required to delay performance of the function until a more cost effective time (e.g., weekend or evening) or until the device 110 is in a more cost effective area (e.g., the home area).

If the function that the program is trying to perform is of very high value, the module 310 may determine (e.g., from preferences preset by the user, from prompting the user, using its learning abilities, etc.) that the program should be permitted to access the service to perform the function currently, even if the cost is high. If the function is of medium to low value but is of low cost or is free, the module 310 may decide to allow the function to be performed. Thus, the module 310 uses the comparison information provided by module 308 to assess the various options and determine whether the program should currently be permitted to proceed with a particular function.

As described above, the cost control module 120 can be implemented and used in different manners. For example, the module 120 can be integrated into program which installs itself with its own blank database (e.g., database 311). As time passes, the learning abilities described above can allow the user to fully populate the database 311 with his/her mobile service subscription plan. Thus, over time, the user may no longer need to interact with the user interface as programs are running on the device 110 to provide input. In other embodiments, the cost control module 120 is integrated into an operator-provisioned device (e.g., a device controlled by a service provider, such as VERIZON® Wireless) for use by all installed applications. The operator can push onto the mobile device 110 a database with subscriber's plan, thus having all cost basis information already on the device. In this embodiment, the user is not prompted for information regarding the user's plan, but instead the information is pre-inserted into the database. In some embodiments, the user still provides information regarding the value associated with various functions that programs may perform. Default values can also be set in advance that the user has the option of modifying or not, according to the user's preferences.

Figure 7:
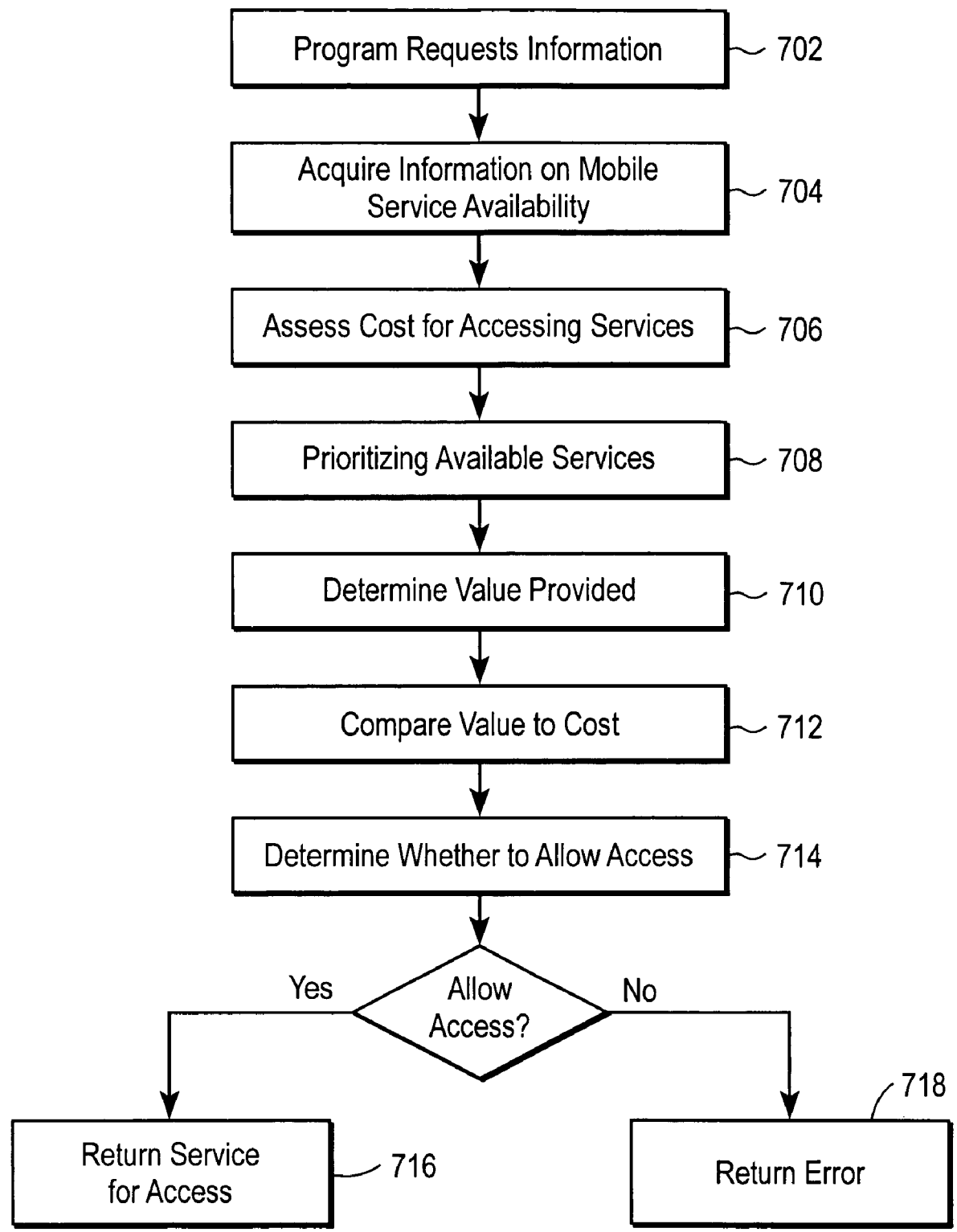
FIG. 7 is a flowchart illustrating the operation of the cost control module 120, according to one embodiment of the present invention.

Referring now to FIG. 7, there is shown a flowchart illustrating the operation of the cost control module 120, according to some embodiments of the present invention. Specifically, FIG. 7 illustrates an overall view of the steps performed by the cost control module 120 in controlling costs associated with automated access to a mobile data service. It should be understood that these steps are illustrative only. Different embodiments of the cost control module 120 may perform the illustrated steps in different orders, omit certain steps, and/or perform additional steps not shown in FIG. 7 (the same is true for FIG. 8).

As shown in FIG. 7, a program trying to perform a particular function (e.g., download virus definitions or software updates, etc.) requests 702 information regarding a mobile data service that the program can access to perform the function. Thus, the program queries the cost control module 120 for recommended/allowed service(s) through which the program can perform its work. The program can also provide information to the cost control module 120. For example, the program can provide information regarding a list of possible services through which the work can be performed (e.g., aServiceList, such as GPRS, CSD, 802.11, etc.). The program can also provide information regarding the context of the data transfer that the program will conduct (e.g., aContext, such as virus definition downloads, program updates, etc.). The program further can provide information about the importance or value provided to the program if granted access to one of the listed services (e.g., aValue that can be Low, Medium, High, and the like). As a result, the program expects the cost control module 120 to return a mobile data service through which the program can perform its work, or an error based on which the program can take corrective action.

In response to a request 702 from the program, the cost control module 120 acquires 704 information regarding mobile data services available for a program to access to perform the function. As described above, one or more MSTMS records 400 can be created describing the currently available services (e.g., GPRS, CDS, etc.). The cost control module 120 also assesses 706 the costs for accessing these available services. In some embodiments, the module 120 retrieves from the database 311 information regarding the cost of accessing each service in the current set of MSTMS records 400 describing the user's mobile service plan (e.g., see examples in FIG. 6). These MSTMS records 400 provide information about the costs of accessing various services under the user's plan at various locations and times of day. Using this information, it is possible to determine the cost of accessing a particular service at the current mobile device 110 location and at the current time of day. As shown in the FIG. 6 example, there may be various options for accessing the service through various mobile service providers (e.g., CINGULAR®, T-MOBILE®, etc.) at different costs. The module 120 also can prioritize 708 the available mobile data services based on the cost to select a preferred mobile data service for access by the program. In some embodiments, the module 120 uses a set of predefined rules, such as cost comparison and preferential ordering rules to select the best or most cost effective service.

In some embodiments, the module 120 also determines 710 the value provided by the function that the program is trying to perform. This value can include the value provided to the program if it is given access (e.g., the aValue defined above) and/or the value provided to the user if the program is given access (e.g., by prompting the user, by retrieving values that the user predefined, by using default values, etc.). The module 120 compares 712 the value provided if the program is granted access to the preferred mobile data service to the cost for accessing the preferred mobile data service. The module 120 also determines 714 whether or not to allow the program to access the preferred mobile data service based on the comparison. If the module 120 determines 714 that access should be allowed, the module 120 can return 716 to the program that initially requested 702 information the preferred service through which the program can perform its work. If the module 120 determines 714 that access should not be allowed, the module 120 can return 718 an error to the program requesting access. In some embodiments, the program will respond to receiving an error by taking corrective actions. For example, the program can delay the work it was trying to perform until a later date/time or until the user moves to a different location (e.g., a non-roaming location). As another example, the program may be authorized to perform only a portion of the work, or the program can be notified that that type of work is not to be performed at all.

Figure 8:
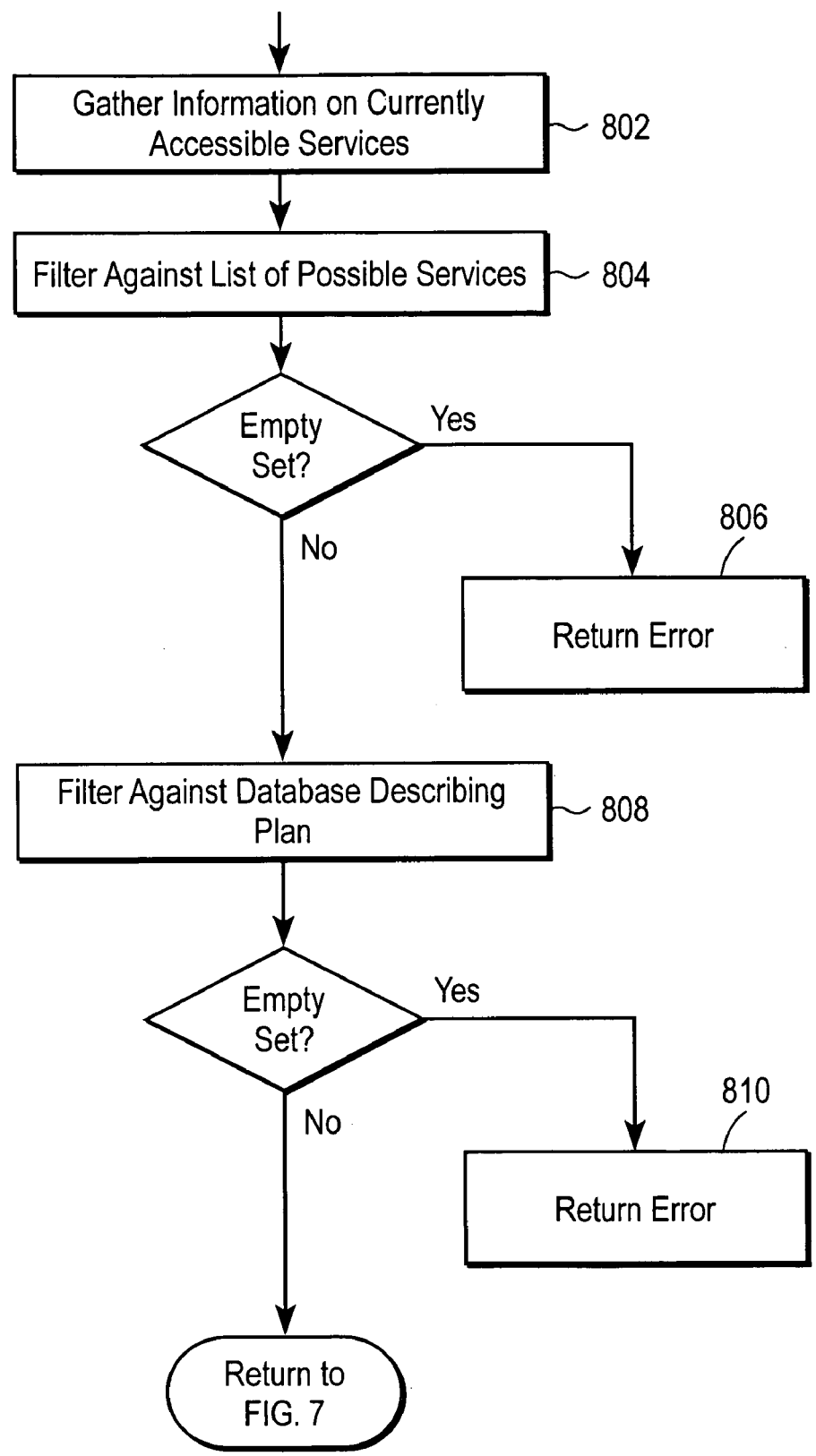
FIG. 8 is a flowchart illustrating a more detailed view of step 704 of the operation of the cost control module 120, according to one embodiment of the present invention.

Referring now to FIG. 8, there is shown a flowchart illustrating a more detailed view of step 704 of the operation of the cost control module 120 involving acquiring 704 information on mobile service availability, according to some embodiments of the present invention. FIG. 8 illustrates just one example of how the acquiring 704 information step can occur, but there are many other possibilities, some of which were described previously.

In some embodiments, in performing step 704 (acquiring information), the cost control module 120 gathers 802 information on all currently accessible services by the mobile device 110. The result is a set of MSTMS records 400 as described previously, and as shown in FIG. 5. In some embodiments, the produced set of MSTMS records 400 is filtered 804 against the list of possible services through which the application can perform its work. As described above, in some embodiments, the module 120 acquires this list of possible services from the program itself. In these embodiments, all MSTMS records 400 for services not specified in the list (e.g., not specified by aServiceList) are removed from the set of MSTMS records 400 since these services cannot be used by the program to perform its work. If there are no services left in the set and the resulting set is empty, then the program cannot perform its work, and the module returns 806 the appropriate error.

If there are services left in the set and the set is not empty, the set can be filtered 808 against information in the database 311 describing the user's subscription plan (e.g., the MSTMS records 400 describing the providers through which the user can gain access to a service under his/her plan). The available services for which the user does not subscribe can be filtered out, since the service provider will likely block attempts by the program to use these services (even though the mobile device 110 sees the services as physically available on the operator network 112). If the resulting set is not empty and there are services left, the module 120 moves onto the next step in the process of assessing 706 cost of this set of services (as shown in FIG. 7). If the resulting MSTMS record set is empty and there are no services left in the set, the module 120 can return an error 810.

In some embodiments, if the resulting set is empty after filtration step 808, it is determined whether or not the module 120 is provisioned with learning abilities. If not, the module 120 still returns the appropriate error. If so, the user can be prompted to enter information. For example, the user might be prompted to enter subscription information and cost basis for each entry discarded by step 808. The user can be prompted with a user interface dialog box asking the user to choose a service from the discarded MSTMS records to be used by the program under the current context and under all other contexts providing equal or higher value to the program. The user can respond by canceling the process if the cost is not justified or if the user is not interested in having the program perform that particular function. If the user makes the decision to cancel, then the module 120 can return an error to the program. If the user responds to the prompt and one or more services are identified through which the program can perform its function, then the module 120 moves onto the next step in the process of assessing 706 cost of the services in FIG. 7. For example, the user might respond by choosing a service from the discarded MSTMS records, and then the corresponding MSTMS record(s) can be stored into the database and can be used to proceed on to the next step.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

I claim:

1. A computer-readable storage medium having executable computer program instructions recorded thereon for controlling costs associated with access to a mobile data service through a mobile device, the computer program instructions comprising instructions for:
   acquiring information regarding mobile data services available for a program on the mobile device at a current time in a current location to access to perform a function, wherein the information acquired is represented in one or more records, and a record uniquely represents the mobile device's position in a multi-dimensional space including dimensions for mobile space, time, and mobile service;
   assessing the costs for accessing the available mobile data services by the mobile device at the current time in the current location;
   prioritizing the available mobile data services based on the costs to select a preferred mobile data service for access by the program, wherein prioritizing the available mobile data service comprises ordering the available mobile data services according to an expense to access the services at a current time and location;
   determining a value of the function based on a level of importance associated with the function;
   comparing the value to the costs for accessing the preferred mobile data service; and
   determining whether to allow the program to access the preferred mobile data service based on the comparison.

2. The computer-readable storage medium of claim 1, wherein the value measures a benefit conferred to the user if the program is granted access to the preferred mobile data service, and wherein the value is determined based on value information provided by the program about the value of performing the function.

3. The computer-readable storage medium of claim 1, wherein the computer program instructions for acquiring information further comprise instructions for:
   filtering the one or more records against a list of possible services through which the function can be performed to create a set; and
   filtering the set to remove from the set services to which the user does not subscribe.

4. The computer-readable storage medium of claim 1, further comprising executable computer program instructions for collecting and storing information about user preferences in advance of performing one or more of the steps for controlling costs.

5. The computer-readable storage medium of claim 1, wherein the computer program instructions for prioritizing the available mobile data services based on the costs further comprise instructions for ordering the available mobile data services from least expensive to access to most expensive to access at a current time and location.

6. A computer-implemented method of controlling costs associated with access to a mobile service through a mobile device, the method comprising:
   using a computer processor configured to execute method steps, the steps comprising:
      acquiring information regarding mobile data services available for a program on the mobile device at a current time in a current location to access to perform a function, wherein the information acquired is represented in one or more records, and a record uniquely represents the mobile device's position in a multi-dimensional space including dimensions for mobile space, time, and mobile service;
      assessing the costs for accessing available mobile data services by the mobile device at the current time in the current location;
      prioritizing the available mobile data services based on the costs to select a preferred mobile data service for access by the program, wherein prioritizing the available mobile data service comprises ordering the available mobile data services according to an expense to access the services at a current time and location;
      determining a value of the function based on a level of importance associated with the function;
      comparing the value to the costs for accessing the preferred mobile data service; and
      determining whether to allow the program to access the preferred mobile data service based on the comparison.

7. The method of claim 6, wherein information describing a plan subscribed to by the user is represented in one or more records that include information regarding the costs of the available mobile data services provided under the plan.

8. The method of claim 7, wherein the one or more records are stored in a database and are retrieved for future cost analyses for accessing mobile data services.

9. The method of claim 6, further comprising collecting information about user preferences in advance of performing one or more of the steps for controlling costs, wherein the user preferences are learned and applied in future cost analyses for accessing mobile data services.

10. A computer system for controlling costs associated with access to a mobile service through a mobile device, the system comprising:
 a computer-readable storage medium storing executable software modules, comprising:
  an information acquisition module for acquiring information regarding mobile data services available for a program on the mobile device at a current time in a current location to access to perform a function, wherein the information acquired is represented in one or more records, and a record uniquely represents the mobile device's position in a multi-dimensional space including dimensions for mobile space, time, and mobile service;
  a cost assessment module for assessing the costs for accessing available mobile data services by the mobile device at the current time in the current location;
  a prioritization module for prioritizing the available mobile data services based on the costs to select a preferred mobile data service for access by the program, wherein prioritizing the available mobile data service comprises ordering the available mobile data services according to an expense to access the services at a current time and location;
  a value determination module for determining a value of the function based on a level of importance associated with the function;
  a comparison module for comparing the value to the costs for accessing the preferred mobile data service;
  a decision module for determining whether to allow the program to access the preferred mobile data service based on the comparison; and
 a processor configured to execute the software modules stored by the computer readable storage medium.

11. The system of claim 10, wherein the value measures a benefit conferred to the user if the program is granted access to the preferred mobile data service.

12. The system of claim 10, the value determination module is further configured to include learning abilities allowing the value determination module to remember information about user preferences for use in future cost analyses.

13. The system of claim 10, wherein the information acquisition module is further configured for:
 filtering the one or more records against a list of possible services through which the function can be performed to create a set; and
 filtering the set to remove from the set services to which the user does not subscribe.

14. The system of claim 10, wherein the mobile device includes preset information regarding the costs of mobile data services to which the user subscribes.

15. A computer system for controlling costs associated with access to a mobile service through a mobile device, the system comprising:
 a computer-readable storage medium storing executable computer instructions, the computer instructions comprising:
  means for acquiring information regarding mobile data services available for a program on the mobile device at a current time in a current location to access to perform a function, wherein the information acquired is represented in one or more records, and a record uniquely represents the mobile device's position in a multi-dimensional space including dimensions for mobile space, time, and mobile service;
  means for assessing the costs for accessing available mobile data services by the mobile device at the current time in the current location;
  means for prioritizing the available mobile data services based on the costs to select a preferred mobile data service for access by the program, wherein prioritizing the available mobile data service comprises ordering the available mobile data services according to an expense to access the services at a current time and location;
  means for determining a value of the function based on a level of importance associated with the function;
  means for comparing the value to the costs for accessing the preferred mobile data service;
  means for determining whether to allow the program to access the preferred mobile data service based on the comparison; and
 a processor configured to execute the computer program instructions stored by the computer readable storage medium.

\* \* \* \* \*